United States Patent
Blaisdell

(10) Patent No.: US 8,214,885 B2
(45) Date of Patent: Jul. 3, 2012

(54) MANAGING NETWORK COMPONENTS USING USB KEYS

(75) Inventor: James Blaisdell, Novato, CA (US)

(73) Assignee: Mocana Corporation, San Francisco, CA (US)

( * ) Notice: Subject to any disclaimer, the term of this patent is extended or adjusted under 35 U.S.C. 154(b) by 922 days.

(21) Appl. No.: 11/800,609

(22) Filed: May 7, 2007

(65) Prior Publication Data

US 2008/0281953 A1     Nov. 13, 2008

(51) Int. Cl.
*H04L 29/06* (2006.01)
(52) U.S. Cl. .............................. 726/5; 709/223; 726/25
(58) Field of Classification Search .................. None
See application file for complete search history.

(56) References Cited

U.S. PATENT DOCUMENTS

| | | | |
|---|---|---|---|
| 7,000,026 B2 | 2/2006 | Beshi et al. | |
| 2004/0073672 A1 | 4/2004 | Fascenda | |
| 2005/0149204 A1 | 7/2005 | Manchester et al. | |
| 2005/0149757 A1 | 7/2005 | Corbett et al. | |
| 2005/0198221 A1* | 9/2005 | Manchester et al. | 709/220 |
| 2006/0090199 A1* | 4/2006 | Okano | 726/6 |
| 2006/0112184 A1 | 5/2006 | Kuo | |
| 2006/0294105 A1* | 12/2006 | Rosenan et al. | 707/9 |
| 2007/0043829 A1* | 2/2007 | Dua | 709/219 |
| 2007/0113276 A1* | 5/2007 | Shoji et al. | 726/17 |
| 2007/0234043 A1* | 10/2007 | Miyazawa | 713/156 |

FOREIGN PATENT DOCUMENTS

| | | |
|---|---|---|
| EP | 2003098461 | 11/2003 |
| WO | 03/098461 | 11/2003 |

OTHER PUBLICATIONS

PCT International Search Report; PCT/US2008/062888; Apr. 9, 2008.
EPO Examination Report dated Apr. 26, 2010; App. No. 08 747 780.8-2413; 4pgs.
IPRP dated Nov. 10, 2009; App. No. PCT/US2008/062888; 8pgs.
Australian PTO Search Report & Written Opinion; Nov. 8, 2010; Appl. No. 200907291-9.
Singaporean Search and Examination Report dated Jul. 19, 2011 from Singaporean Application No. 200907291-9.
Australian Office Action dated Mar. 1, 2011 from Australian Application No. 2008248385.
Chinese Office Action dated Dec. 19, 2011 from Chinese Application No. 200880014945.1 (English translation provided).

* cited by examiner

*Primary Examiner* — Gilberto Barron, Jr.
*Assistant Examiner* — David Le
(74) *Attorney, Agent, or Firm* — Beyer Law Group LLP

(57) ABSTRACT

Devices and methods for managing a communications network include using USB keys to provision and management components in the network by having the network component establish a connection to a network administrator device, such as a laptop, PDA, or desktop workstation. A first USB key is used to provision a network component so that it has the necessary security information to interact with a second USB key, used to enable actual management of the component. Once the component has the security information, the second USB key is inserted and certain callback data are made available to the component. It uses this data to make a "call" or connection to an administrator's device. The callback data may be an IP address of the device, an e-mail address, VoIP data, instant messaging data, dial-up data, and so on. Once the connection, initiated and established by the network component, is made the administrator can begin managing the component.

21 Claims, 7 Drawing Sheets

*FIG. 3*

WORKSTATION 1:
- IP ADDRESS/E-MAIL ADDRESS — 304
- DIAL-IN DATA/PHONE NUMBER — 306
- VoIP DATA — 310
- IM DATA — 312

WORKSTATION 2:
- IP ADDRESS/E-MAIL ADDRESS
- DIAL-IN DATA/PHONE NUMBER
- VoIP DATA
- IM DATA

MOBILE DEVICE 1:
- IP ADDRESS
- DIAL-IN DATA

⋮

CERTIFICATION/AUTHENTICATION DATA — 308

USB PROVISIONING

| | |
|---|---|
| 402 | NETWORK ATTRIBUTES |
| 404 | IP ADDRESS |
| 406 | DNS SERVER NAMES/ADDRESSES |
| 408 | MAIL SERVER DATA |
| 410 | GATEWAY DATA |
| 412 | SECURITY CERTIFICATES INFORMATION |
| 414 | COMPONENT DEPENDENT INFORMATION |
| 416 | ADDITIONAL SOURCES |
| 418 | NETWORK ACCESS INFORMATION |
| 420 | FIRMWARE INFORMATION |

MANAGING NETWORK COMPONENTS USING USB KEYS

BACKGROUND OF THE INVENTION

1. Field of the Invention

The present invention relates to computer network management. More specifically, it relates to provisioning and managing components in a computer network using USB memory devices that enable components to connect to network technician devices.

2. Description of the Related Art

Managing computer networks has become an increasingly complex and expensive endeavor for many organizations. Networks are often comprised of hundreds or even thousands of network components and devices that may be spread over wide geographical areas. This has resulted in the total cost of ownership of a network component in an enterprise environment rising significantly. Initially, networks are organized, orderly, and easy to manage, for example, devices are assigned logical addresses and they are categorized in understandable ways. However, over time, components move to different ports in a router, for example, or initially well-defined software to configure the network components may no longer be applicable or effective.

Many of these problems stem from the fact that the network components are not readily identifiable and in order for a network technician to connect to the component, he or she must be able to identify the equipment. The problem of identifying the equipment is amplified with the advent of IPv6 which uses 16 octets for addresses, and requires that technicians remember or keep track of longer IP addresses.

To illustrate, suppose a network has thousands of switches. Each switch typically needs to be configured individually, which, in turn, may involve running a cable from the technician's laptop to the switch which, in turn, may involve physically moving the box, while the technician types in data, like the IP address of the switch and other component-related data, and then place the box back in its location, often in a congested network component closet. The need to physically connect to the component has also prevented the effective use of hand-held mobile devices which often lack the necessary interfaces, such as RS232, needed to connect to the network component.

Thus, it would be desirable to reduce the complexity and inefficiencies that occur while managing network components and decrease the time a technician spends interacting with a component, thereby bringing down the overall cost of maintaining the network. It would also be desirable to have a portable device to facilitate the management and provisioning of network devices.

SUMMARY OF THE INVENTION

One aspect of the present invention is a network management apparatus consisting of, in one embodiment, two USB storage devices or "keys". One of the USB keys contains specific provisioning data such as public key data relating to the network, including root certificate authority data and various IP addresses. The provisioning data are uploaded from a network administration computer or other appropriate device on the network onto the provisioning USB key. This key is inserted into a network component (any type of device on a communications network that has a USB port) to prepare the component by supplying public key data, certificate authority data, and the like. Once the network device has been provisioned using the first USB key, the management phase can begin. In this phase, a second management USB key is inserted into the component. Using the security data from the provisioning key, the component can authenticate and verify the management USB key and the data contained therein, which all have signatures. For example, the public key data can be used to check the signatures and decrypt the data. This is done to ensure that the network component can trust the data on the second USB key, which is important since this will be used to initiate the management process for the component.

One category of data on the management USB key is callback data. This data can be used by the component to initiate a connection to a network administrator's device, such as a hand-held device, a laptop computer, a tablet computer, or desktop network workstation (collectively referred to as "administrator device"). The callback data may include IP addresses of the administrator devices, dial-in data for those devices, voice-over-IP (VoIP) data, instant messaging (IM) data, e-mail addresses, and so on. The most suitable callback data is used by the network component to establish a connection with the administrator device. Once a connection is made, the network administrator can begin managing the component. The connection may be a wireless connection (for example, with a laptop or PDA) or a wired connection via the network to a desktop workstation computer which, for wide area networks, can be in a different geographical location. In this manner, a network administrator does not have to spend time and effort in connecting to the network component. Having to find the correct "contact information" for the network component can often be a time-consuming and tedious task, especially when networks have grown substantially and components have been re-configured over time. By having the network component make a connection with the administrator device automatically, the administrator can begin focusing on actual management of the component rather than the pre-requisite steps needed for making a connection in the other direction.

BRIEF DESCRIPTION OF THE DRAWINGS

References are made to the accompanying drawings, which form a part of the description and in which are shown, by way of illustration, specific embodiments of the present invention:

FIG. 3 is a data configuration diagram showing technician device "call-back" data that can be utilized by a network component in accordance with one embodiment of the present invention.

FIG. 4 is a block diagram showing various types of data stored on a USB key for provisioning and managing components in a network in accordance with one embodiment of the present invention.

DETAILED DESCRIPTION OF THE INVENTION

Example embodiments of a network utilizing novel network component management and provisioning processes and systems according to the present invention are described. These examples and embodiments are provided solely to add context and aid in the understanding of the invention. Thus, it will be apparent to one skilled in the art that the present invention may be practiced without some or all of the specific details described herein. In other instances, well-known concepts and networking components and technologies have not been described in detail in order to avoid unnecessarily obscuring the present invention. Other applications and examples are possible, such that the following examples, illustrations, and contexts should not be taken as definitive or limiting either in scope or setting. Although these embodiments are described in sufficient detail to enable one skilled in the art to practice the invention, these examples, illustrations, and contexts are not limiting, and other embodiments may be used and changes may be made without departing from the spirit and scope of the invention.

Methods and systems for actively managing and provisioning components in a computer network using a USB memory key also referred to as a memory "stick" or similar device, are described in the various figures. A USB key or other similar device is used to facilitate a connection between a network component and a network technician's computing device. In this manner, a technician's interaction with the device is reduced. Although a USB key is used to illustrate the described embodiment, any other suitable portable memory device, such as an EEPROM, U3 key, or network card that can be easily inserted and removed from a network component may be used in alternative embodiments.

Figure 1A:
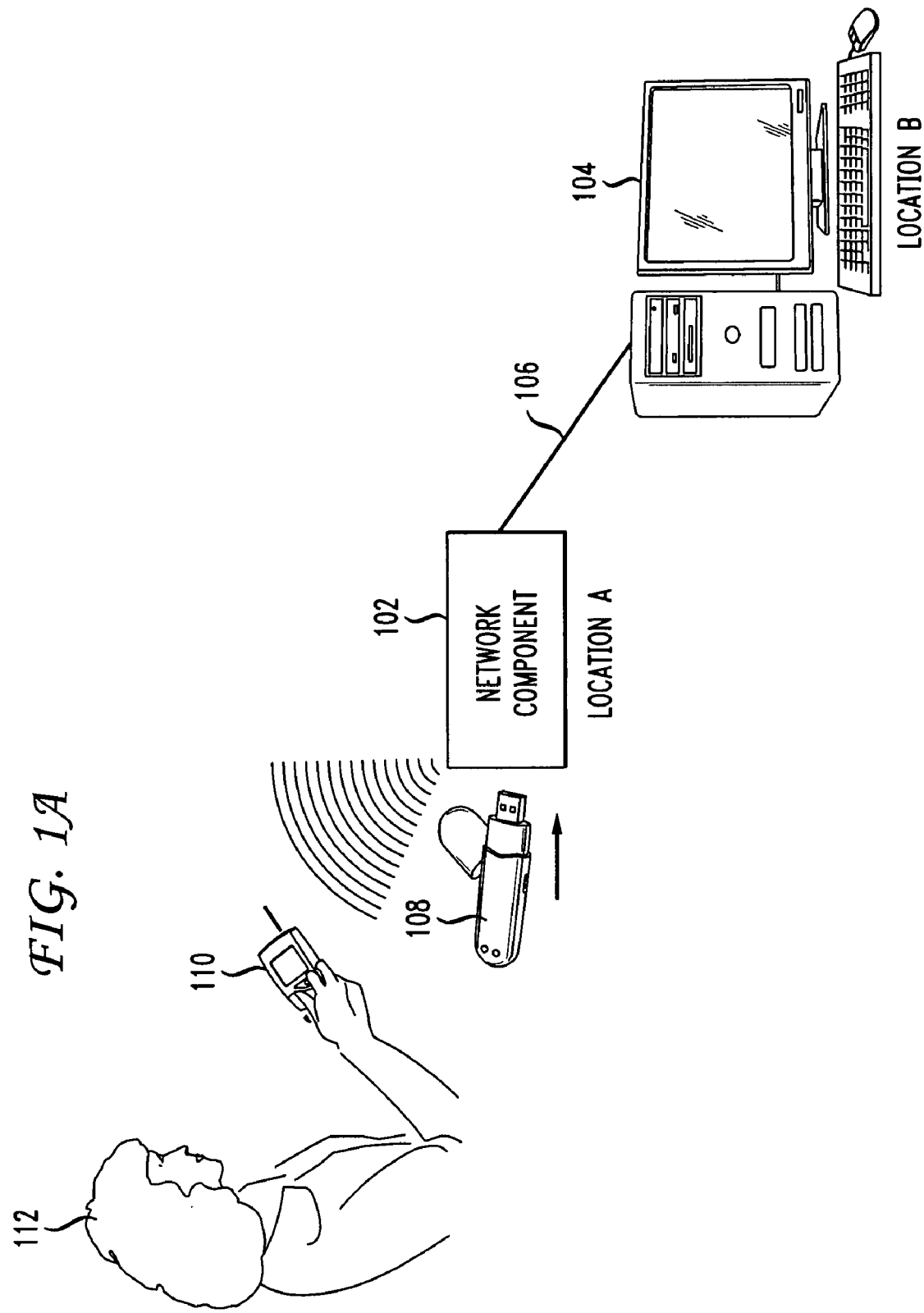
FIG. 1A is a simplified network diagram showing two possible configurations of the present invention.

FIG. 1A is a simplified network diagram showing two possible configurations of the present invention. A network component 102 is connected to a workstation computer 104 via a network connection 106. These components are part of a larger network not shown. The processes and devices described as part of the present invention can be used in any type of data communication network that is comprised of network components that require management and provisioning. Such networks may be relatively small, such as home networks, or very wide area networks that span many geographical areas. Network component 102 may have a physical presence at location A which is different from the physical presence of workstation 104 at location B. For the purposes of clarity in the following description, a "technician," such as person 112, is defined as a network administrator or operator, or any person in an organization responsible for managing and provisioning components in a data communication network of the entity or organization. A "technician device" is used herein to describe either a network workstation computer such as workstation 104, typically a desktop computer, or it may be a portable IP-ready or enabled computing device 110, such as a hand-held PDA, laptop or notebook computer, a tablet-style computer, a hand-set device and the like, that can be carried and used by a technician at various locations to manage and provision components in a network. These technician devices and, in particular, the network workstation computer, have special network privileges and securely stores network and related administrative data. As used in the description below and for clarity, a network is comprised of numerous types of "components," such as end-user computers, printers, various types of servers, switches, gateways, routers, storage network components, network caches, firewalls, "multi-purpose" boxes (having two or more network components contained therein), and so on. These components are often in areas that make them difficult to access, such as in network closets or component racks. Such network components are well known in the art and may include a wide variety of other components. In the broadest sense, it should be noted that the technician devices are themselves components in the network and can be managed and provisioned using the methods and devices of the present invention. Furthermore, the present invention can be used in a wide variety of data communication networks, topologies, and methodologies.

Also shown in FIG. 1A is a USB key 108 insertable into network component 102. Many network components have USB ports or other types of ports that can operate with other types of portable memory devices. Once inserted and security credentials have been established, component 102 can communicate with mobile technician device 110 operated by technician 112, via a wireless connection as shown or wired connection, as with workstation 104. It is worth noting again that FIG. 1A is a simplified diagram and that the advantages of the present invention are clearly seen in networks that may have, for example, hundreds or thousands of components that need to be managed and that network component 102 may be in a rack in a network closet with numerous other components. In another example, component 102 may be in a different geographical location from workstation 104.

Figure 1B:
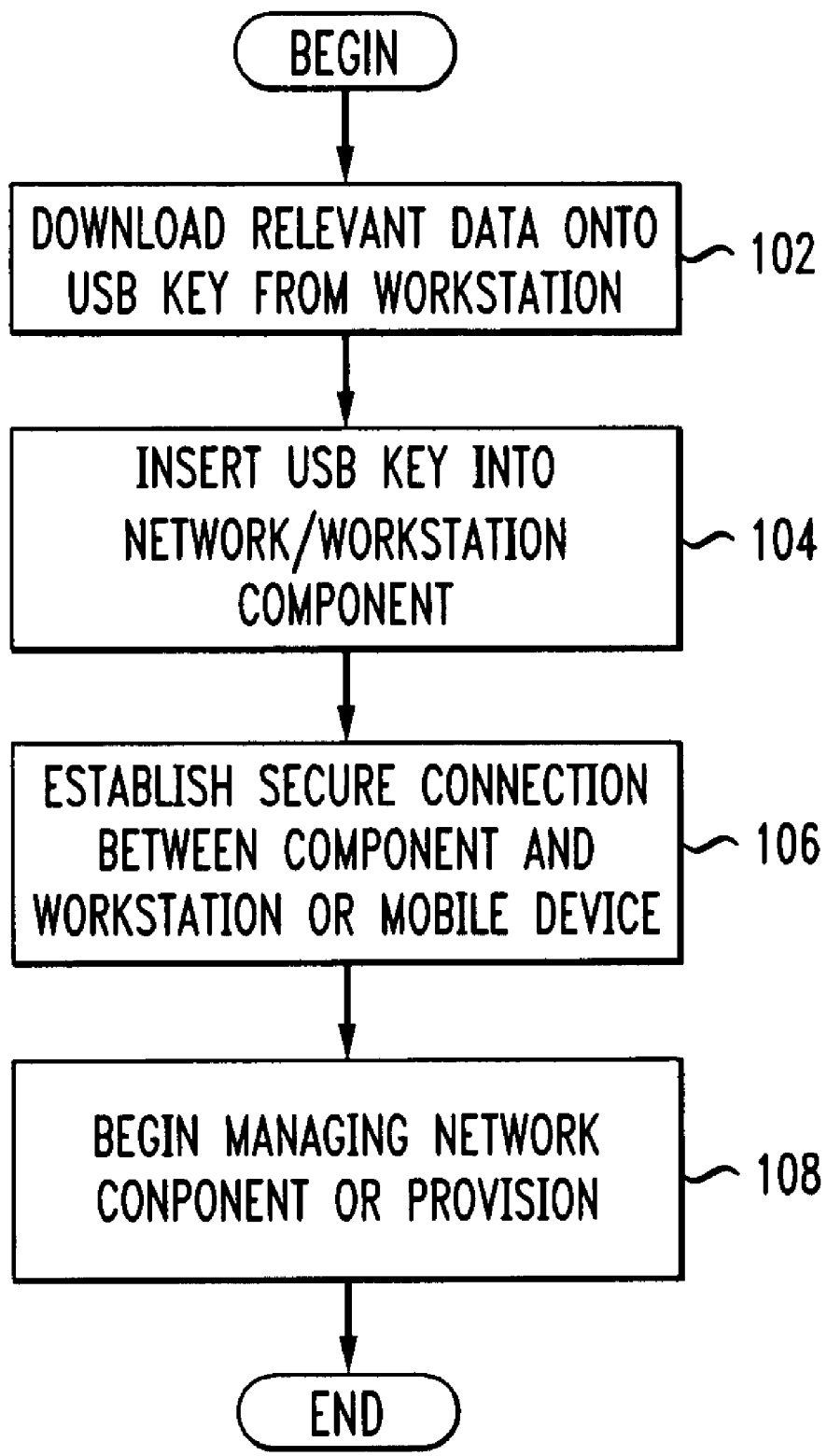
FIG. 1B is a flow diagram of one exemplary process of using a USB key to establish a secure connection between a network component and a technician device in accordance with one embodiment of the present invention.

FIG. 1B is a flow diagram of one exemplary process of using a USB key to establish a secure connection between a network component and a technician device in accordance with one embodiment of the present invention. At step 102 data are downloaded from a network workstation such as workstation 104, onto a USB key. The data may also be downloaded from a portable technician device 110, such as a laptop computer. The data downloaded are described in greater detail below and include security credential data and network component attribute data. At step 104 the USB key is inserted into the network component. Other types of portable storage devices may be used if a component does not support USB, such as a Firewire (IEEE 1394) device, a U3 key, and so on. At step 106 a secure connection is established between the network component and a network workstation or mobile technician device. One process of creating this secure connection is described in FIG. 5. At step 108 the network technician begins managing the network component.

Figure 2:
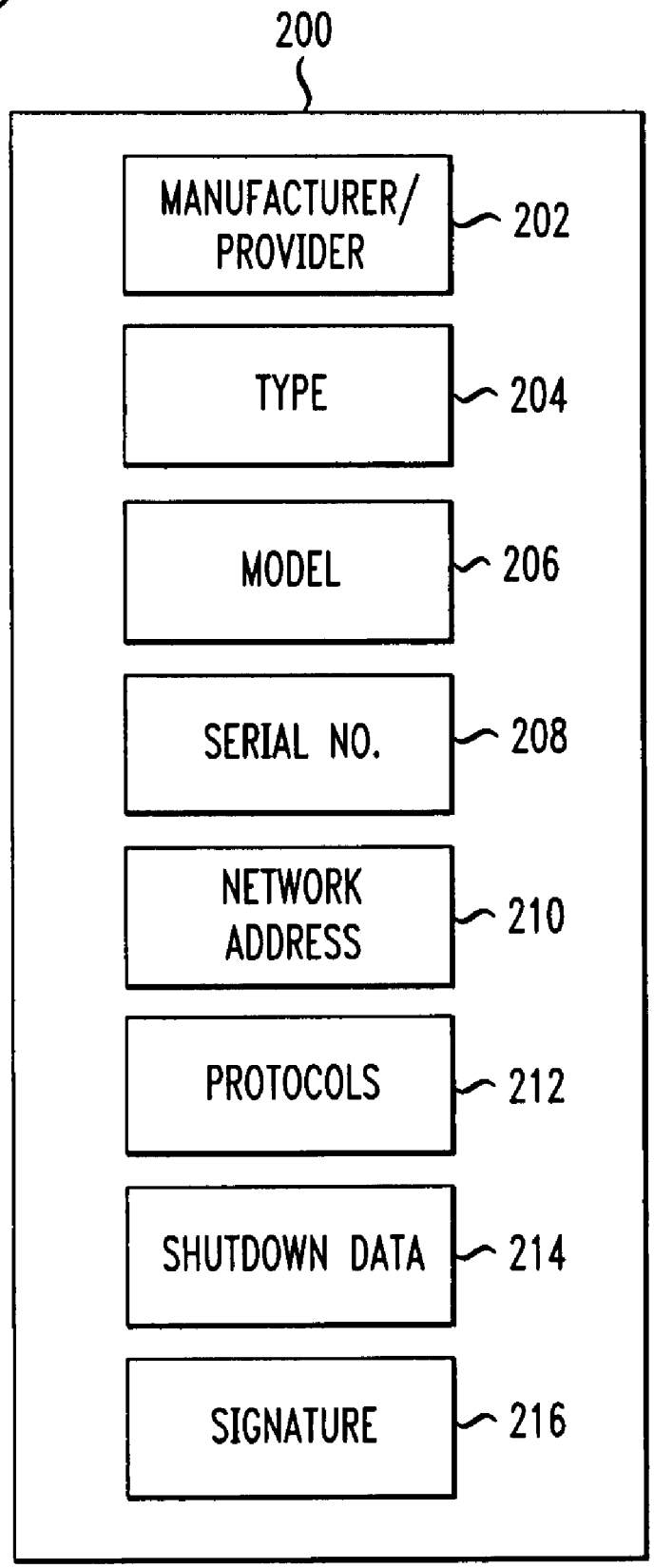
FIG. 2 is a block diagram showing data stored on a USB key for managing network components in accordance with one embodiment of the present invention.

In the described embodiment, a USB key is used to actively manage some or all components in a network. FIG. 2 is a block diagram showing data stored on a USB key for managing network components in accordance with one embodiment of the present invention. In a memory area 200, numerous types of data may be stored. In the described embodiment, the data are organized based on each individual network component. For each component, a manufacturer or provider name 202 is stored, for example, Nortel, Cisco, and the like. A network component type 204, such as those noted above (server, router, switch, network cache, etc.) is also saved. Various other data relating to a component are also stored: model information 206 (e.g., for a Cisco router, 7200VXR), serial number or a generic default serial number 208, and component network IP address 210. These data items identify a specific network component. Other data that may be included are component protocol data 212 describing the various protocols or a single protocol that the component operates by. In another embodiment, there is also connection shutdown data 214 for disabling or shutting down a connection between the network component and a technician device. In the described embodiment, each network component has a signature 216. The set of data in memory area 200 is provided for each network component in the network or in a subset of the components, the subset corresponding to the components that can be provisioned and managed by the USB key. For example, a USB key may only be able to manage network components at a particular location and so will only have the data set 200 for those components in the network. Of course, the order of the data can vary and need not follow the order in which the data are described or shown in FIG. 2. Additional data may also be included as described in FIG. 4. In other embodiments, less data than shown in FIG. 2 may be stored without preventing use of the methods and systems of the present invention.

In the described embodiment, a network technician uses USB key 108 to download or transfer onto network component 102 sufficient data so that the component can make contact with network workstation 104 or portable IP-enabled technician device 110. The network component initiates a connection to the technician device, rather than the technician having to connect to the network component. This allows for greater flexibility and ease in managing the network. One of the key factors is that in this manner, a technician's interaction with the component simply to establish a connection (before any management or provisioning work begins) is reduced. For example, the technician does not have to look up, remember, call other technicians, and finally enter the component's IP address or other component-specific data in order to connect to the component.

All components in a network have a physical presence. For example, a component has a specific geographical location and is physically located at one known location. However, each component also has a "network" presence, which may be referred to as a virtual location in that it is not bound or restricted to a physical location and can be anywhere in the network topology. In the described embodiment, by having the component establish a connection with the technician device, the physical presence of the network component is in one respect converted into a network presence.

In the described embodiment in addition to the data described in FIG. 2, another category of data on a USB key is the data used by the network component to establish a secure connection to the technician device, whether it be a workstation or a mobile device. FIG. 3 is a data configuration diagram showing technician device "call-back" data that can be utilized by a network component in accordance with one embodiment of the present invention. In the example shown in FIG. 3, there are two network workstations and two mobile devices that comprise the group of technician devices. In other examples there may be few or more such technician devices (e.g., a VWAN may have dozens of portable technician devices), each having some or all of the data 302 shown, including IP address and e-mail address 304, dial-in data and a phone number 306 for the network workstation or mobile device. In other embodiments, other types of connection-enabling or callback data may be included, such as data that a network component may need to connect to the technician device, including data 310 for making a voice-over-IP (VoIP) call to the device and instant messaging (IM) data 312. Other examples include information on establishing a secure Web or command shell session. The technician can select which workstation or mobile device the network component should connect to, for example, by using a user interface on the component if one is available and the method of callback. In another embodiment, a particular pre-selected technician device and callback process are defaults. In another embodiment, the USB key may only have one workstation or one mobile device's call-back information stored which is used automatically. This may be beneficial if wanting to restrict the use of a USB key in a network (e.g., based on geographic boundaries). In one embodiment, the technician may have a choice of which workstation or modified device the component should connect to.

In the described embodiment, there is automatic certification and authentication between a network component and a technician's device using certificate/authority data 308 stored on the USB key as shown in FIG. 3. In another embodiment, there is also automatic log on with the network component when the USB key is inserted into a component and the component detects that a USB key (or new hardware device) is present. For network component security, before the component reads the data or performs any operation with the data on the USB key, it authenticates the key using a suitable encryption scheme utilizing data 308 on the key. The first time a USB key is used, there may be a higher level of security needed before data are exchanged between the network component and the key. Upon authentication, data are transferred from the USB key to the component's local storage.

In the described embodiment, a separate security credential USB key is inserted into a network component before a management key is used to trouble-shoot, check status or perform other diagnostics on the component. The network component has the public key that corresponds to the private key that was used to sign a certificate on the security USB key. In one embodiment, the component is also given a trust list conveying, for example, that information signed in a certain manner can be trusted. In various embodiments, RSA or DSS encryption schemes may be used.

When the USB key is removed from the network device, the technician is logged off from the network component. This may be handled in the same manner used in the removal of any USB key from the network component.

In the described embodiment, a USB memory device is provisioned and configured in a secure manner and contains numerous categories of data, such as those described in FIGS. 2 and 3. FIG. 4 is a block diagram showing various types of data stored on a USB key for provisioning and managing components in a network in accordance with one embodiment of the present invention. The data includes network attributes 402, such as IP addresses 404 of network components and technician devices, DNS sever names and addresses 406, mail server data 408, gateway data 410, root certificate information 412, and component-dependent information 414, such as component identifiers. It may also contain sources of where to obtain additional provisioning information 416, such as from DHCP servers. Other categories of data include network access information 418, firmware information 420, security certificates/credentials 422, and scripts 424, described below. Security credentials 422 may include a root certificate which provides a trusted list, essentially a list of which certificate authorities the USB key can trust. The root certificate may also provide a public key. As is known in the art, an entity may be its own certificate authority by issuing a root certificate for use within that entity. For example, a large entity, such as multinational corporation, may already have a root certificate which it uses in various security roles (e.g., ID badges), which can be used to implement the USB key provisioning system of the present invention. There may also be a back-up root certificate. In one embodiment, shared secrets (typically in the form of a bit stream) are used to encrypt information. Shared secrets are similar to the functionality of a root certificate but typically do not have all the resources of a root certificate.

Figure 5:
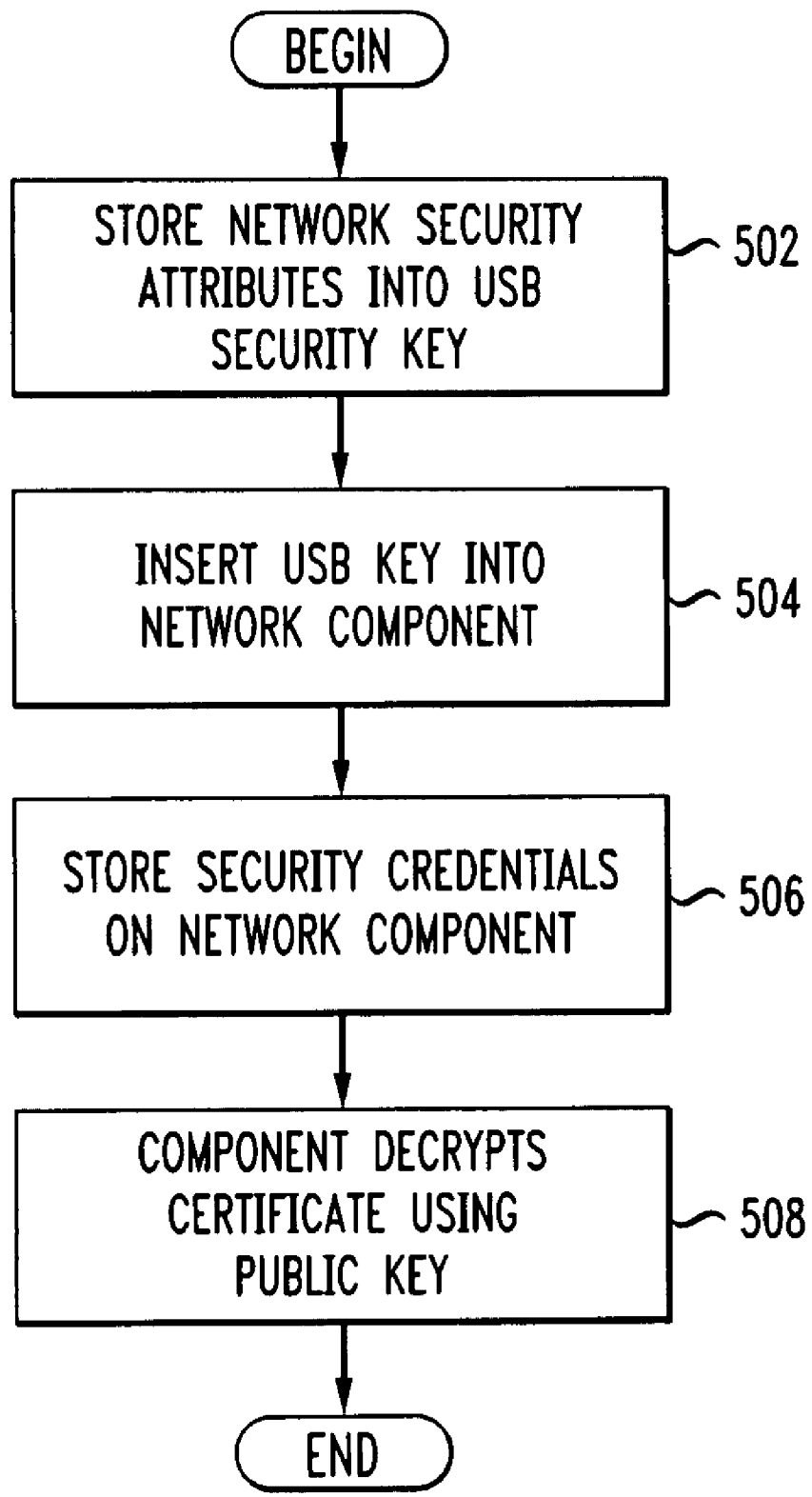
FIG. 5 is a flow diagram of a process for provisioning a USB key and establishing a connection between a technician device and a network component using a USB key in accordance with one embodiment of the present invention.

FIG. 5 is a flow diagram of a process for provisioning a USB key and establishing a connection between a technician device and a network component using a USB key in accordance with one embodiment of the present invention. Steps of the method shown and described herein need not be performed (and in some implementations are not performed) in the order indicated. Some implementations of this method may include more or fewer steps than those described. At step 502 network security attributes are stored onto a security USB key from a network workstation or other source. At step 504 the security USB key is inserted into a network component that the technician wants to manage, trouble-shoot, and so on. After ensuring that it is safe to access data on the USB key (authenticate and verify the key), at step 506 the network component accesses the security credentials data on the USB key and stores the data on the component's local storage. For example, security credentials may consist of a certificate and, in the described embodiment, is initially encrypted or hashed. At step 508 the component decrypts the security credentials using, for example, a public key.

Figure 6:
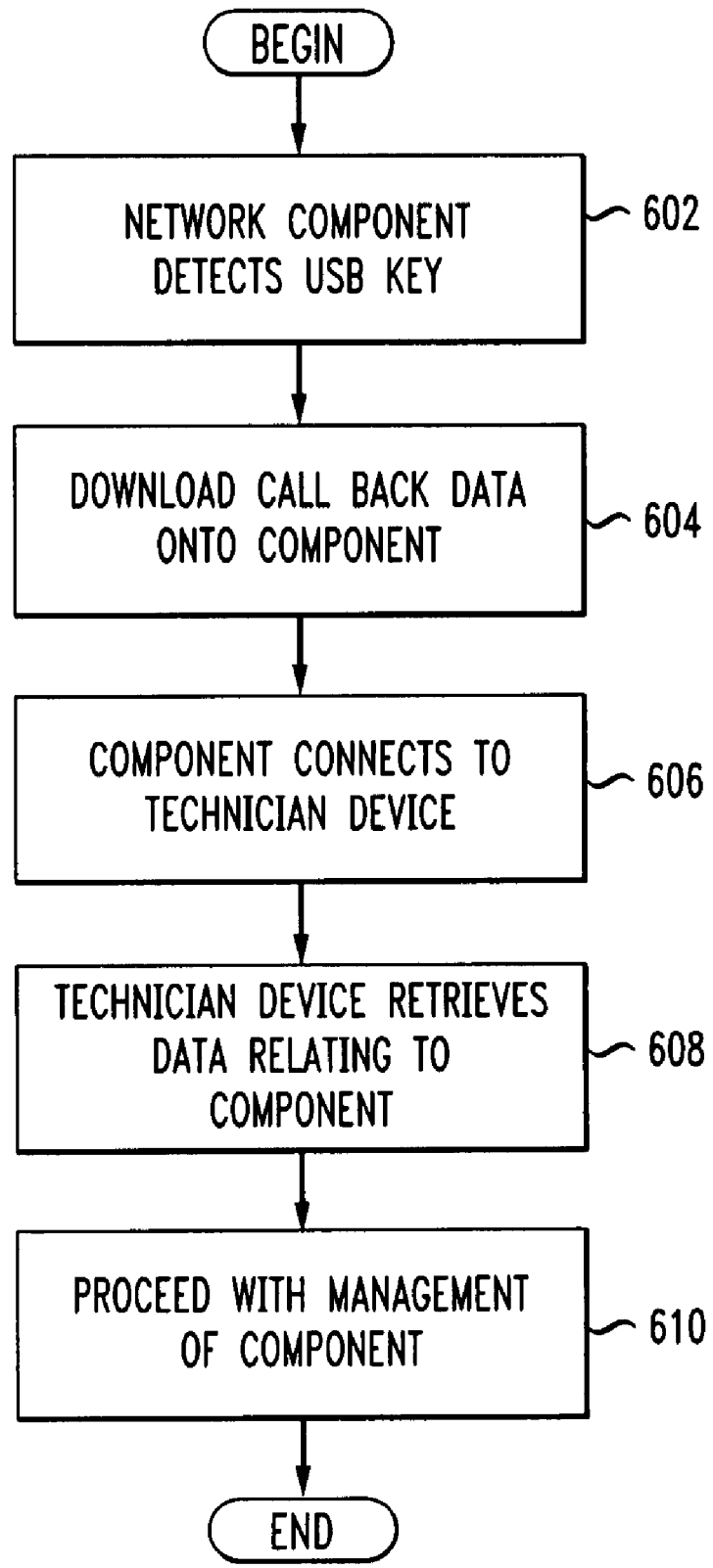
FIG. 6 is a flow diagram of a process of managing a network component using a USB key after security credentials are in place in accordance with one embodiment of the present invention.

FIG. 6 is a flow diagram of a process of managing a network component using a USB key after security credentials are in place in accordance with one embodiment of the present invention. At step 602 a network component detects that a USB key has been inserted into one of the component's USB ports. In one embodiment, at step 604 the component downloads the call back data described in FIG. 3 from the USB key. At step 606 the component connects to the technician device using call-back data 304 and 306. As described above, this may be done using the IP address of the device, e-mail address, or any one of a number of known techniques. At step 608 the technician device retrieves data relating to the component, as described in FIG. 2, from its storage area. At step 610 the technician can proceed with managing the network component.

In another embodiment of the present invention, script programs stored on the USB key may be used to identify network components and to provision the components. Such scripts are encoded in various formats for different network environments. Scripts and associated processes are described in pending U.S. patent application Ser. No. 11/549,115, entitled "USB Provisioning Device," incorporated herein in its entirety and for all purposes. In another embodiment, authentication servers are used for external verification and authentication. In this embodiment, there is external management of authentication.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

I claim:

1. A network management apparatus comprising:
   a first storage device containing public key data, root certificate authority data, a plurality of IP addresses, and technician device-network component connection shutdown data solely for disabling an IP connection between a network component and a technician device, wherein the technician device has special network privileges and securely stores network and related administrative data; and
   a second storage device containing network data, instructional scripts guiding associated operations of the network component when the second storage device is inserted into the network component and technician device callback data relating to establishing only a technician device-network component connection between the network component and the technician device, the technician device callback data in the form of an IP address of the technician device to enable the network component to make an IP connection only to the technician device, wherein the network data and the instructional scripts on the second storage device are signed using the public key data stored on the first storage device.

2. A network management apparatus as recited in claim 1 wherein the first storage device further contains network attribute data.

3. A network management apparatus as recited in claim 1 wherein the first storage device further contains security certificate data.

4. A network management apparatus as recited in claim 1 wherein the first storage device further contains DNS server names and addresses.

5. A network management apparatus as recited in claim 1 wherein the first storage device further contains gateway data.

6. A network management apparatus as recited in claim 1 wherein the second storage device further contains network component data, including component manufacture data, component type, and model data.

7. A network management apparatus as recited in claim 6 wherein the second storage device further contains network component IP address and protocols.

8. A network management apparatus as recited in claim 6 wherein the second storage device further contains technician device-network component IP connection shutdown data.

9. A network management apparatus as recited in claim 1 wherein the first and second storage devices are USB keys.

10. A network management apparatus as recited in claim 1 wherein the first and second storage devices are U3 keys.

11. A method of managing a network comprising:
    storing public-key information and technician device-network component connection shutdown data solely for disabling an IP connection between a network component and a technician device onto a first portable storage device, the technician device having special network privileges and securely storing network and related administrative data;
    storing network data, scripts and technician device callback data onto a second portable storage device;
    provisioning the network component by using the first storage device;
    managing the network component using the second storage device and the technician device, wherein the network component initiates and establishes a connection only with the technician device and wherein the network component is provided with technician device callback data relating to establishing an IP connection between the network component and the technician device allowing the network component to connect only with the technician device, wherein the technician device callback data is in the form of an IP address of the technician device to enable the network component to make an IP connection only to the technician device; and
    disconnecting with the technician device by discontinuing use of the second storage device.

12. A method as recited in claim 11 wherein storing public key information comprises:
   storing one or more of root certificate authority data, IP addresses, gateway data, and network access information.

13. A method as recited in claim 11 further comprising:
   retrieving the public key information from a technician workstation.

14. A method as recited in claim 11 wherein the technician device callback data includes a technician device IP address, voice-over-IP data, instant messaging data, and dial-in data.

15. A method as recited in claim 11 further comprising:
   applying a digital signature to the data stored on the second portable storage device.

16. A method as recited in claim 11 wherein provisioning a network component further comprises:
   reading data on the first portable storage device at the network component and executing the data on the network component, wherein the network component is configured to safely accept data stored on the second storage device.

17. A method as recited in claim 11 wherein provisioning a network component further comprises:
   providing the network component with public key information relating to the network.

18. A method as recited in claim 11 further comprising:
   verifying the signature of the network data and scripts on the second storage device before the data and scripts are executed or read by the network component.

19. A method as recited in claim 11 wherein disconnecting further comprises:
   removing the second storage device from the network component.

20. A method as recited in claim 11 wherein the first and second storage devices are USB keys.

21. A method of enabling a network component to make a connection to a technician device without a technician having to enter network component data into the technician device, the method comprising:
   installing network security data and technician device-network device connection shutdown data solely for disabling an IP connection between the network component and the technician device onto a first USB device from the technician device, wherein the technician device has special network privileges and securely stores network and related administrative data;
   installing technician device callback data onto a second USB device from the technician device, wherein the technician device callback data includes an IP address of the technician device to enable the network component to make an IP connection only to the technician device;
   inserting the first USB device into the network component to download the network security data and the technician device-network device connection shutdown data;
   inserting the second USB device into the network component to download at least a portion of the technician device callback data; and
   establishing a technician device-network device connection between the network component and the technician device using the technician device callback data, wherein the connection is initiated by the network component and is established without any intervention or data input from a technician into the technician device.

* * * * *